(12) United States Patent
Nault et al.

(10) Patent No.: US 6,550,505 B2
(45) Date of Patent: Apr. 22, 2003

(54) LAND CLEARING TRACTOR FOR SELECTIVELY CLEARING A LAND OF BRUSH AND TREES AND PROCESS THEREFOR

(75) Inventors: Louis-Philippe Nault, Dolbeau-Mistassini (CA); Gérard Couture, St-Félicien (CA)

(73) Assignee: Les. Equipements Nokamic Inc. (CA)

( * ) Notice: Subject to any disclaimer, the term of this patent is extended or adjusted under 35 U.S.C. 154(b) by 0 days.

(21) Appl. No.: 09/952,692

(22) Filed: Sep. 13, 2001

(65) Prior Publication Data

US 2002/0033202 A1 Mar. 21, 2002

(30) Foreign Application Priority Data

Sep. 15, 2000 (CA) .............................................. 2319838

(51) Int. Cl.$^7$ ............................................... A01G 23/00
(52) U.S. Cl. ...................... 144/336; 144/34.1; 56/13.6; 56/234; 56/DIG. 9; 37/302; 241/101.72; 241/101.74; 180/9.1; 280/6.15
(58) Field of Search ................................. 56/10.1, 13.6, 56/13.7, 13.8, 233, 234, 235, 328.1, DIG. 9; 37/94, 189, 302; 144/4.1, 34.1, 24.12, 335, 336; 180/9.1; 172/27; 241/101.72; 280/6.15

(56) References Cited

U.S. PATENT DOCUMENTS

| 3,754,603 | A |   | 8/1973  | Bogie |
| 4,232,719 | A |   | 11/1980 | Payton |
| 4,236,554 | A |   | 12/1980 | Nicholson |
| 4,355,670 | A |   | 10/1982 | Ohrberg et al. |
| 4,390,134 | A |   | 6/1983  | Paulve |
| 4,537,362 | A |   | 8/1985  | Zuloaga |
| 5,261,213 | A | * | 11/1993 | Humphrey ............... 56/DIG. 9 |
| 5,378,852 | A | * | 1/1995  | Manor ........................ 144/34.1 |
| 5,526,637 | A |   | 6/1996  | Leonard |
| 5,555,652 | A | * | 9/1996  | Ashby ......................... 37/302 |
| 5,642,765 | A |   | 7/1997  | Brown |
| 6,047,749 | A | * | 4/2000  | Lamb ................. 241/101.72 X |
| 6,230,089 | B1 | * | 3/2001 | Lonn et al. |

* cited by examiner

Primary Examiner—W. Donald Bray
(74) Attorney, Agent, or Firm—Donald R. Boys; Central Coast Patent Agency, Inc.

(57) ABSTRACT

A land clearing tractor and process are provided for selectively clearing a land of brush and trees. The tractor has a traction unit for moving the tractor along a direction of travel. A supporting frame is connected to the traction unit. The frame has first and second sides, and a raised section between the first and second sides. A first shredder head is operatively connected to the first side of the frame and oriented parallel to the direction of travel. The first shredder head is movable between elevated and lowered positions for clearing brush and trees in a first band. A second shredder head is operatively connected to the second side of the frame. The second shredder head is parallel to the first shredder head and is spaced apart therefrom. The second shredder head is movable between elevated and lowered positions for clearing brush and trees in a second band spaced apart from the first band. Thereby, the tractor leaves between the first and second bands a residual band of brush and trees.

15 Claims, 7 Drawing Sheets

LAND CLEARING TRACTOR FOR SELECTIVELY CLEARING A LAND OF BRUSH AND TREES AND PROCESS THEREFOR

FIELD OF THE INVENTION

The present invention generally relates to the field of apparatus for clearing a land. More particularly, it concerns a land clearing tractor for selectively clearing a land of brush and trees and a process for clearing a land of brush and trees.

BACKGROUND OF THE INVENTION

A known procedure which is sometimes called "pre-commercial clearing" consists of selectively clearing a land having brush and young trees in order to keep only certain types of trees, and removing the rest of the undesired brush and trees.

Selective clearing is a silvicultural process, which is generally done manually by workers equipped with portative brush clearing machines. The work involves selecting the stems of trees that are to be kept according to predetermined quantity and quality standards, and then cutting the rest of the brush with the portative brush clearing machines as workers walk on the field. As it can be appreciated, such a manual clearing technique can take an enormous amount of time and a large number of workers, especially if the surface to be cleared is large.

There is therefore a need to provide an apparatus and/or a process for improving such selective clearing.

U.S. Pat. No. 4,355,670 (OHRBERG et al.) discloses a vehicle having a clearing head located at the front of the vehicle for fragmenting woody material. The hydraulically adjustable clearing head includes a horizontally disposed cylindrical drum.

U.S. Pat. No. 4,236,554 (NICHOLSON) discloses a tractor having a front feller and chipper. The feller includes an elongated bladed rotary felling cutterhead having its length extending transversely of the tractor between lower front portions. The chipper includes a chipping cutterhead spaced upwards and rearward from the feller.

U.S. Pat. No. 4,232,719 (PAYTON); U.S. Pat. No. 3,754,603 (BOGIE); U.S. Pat. No. 4,390,134 (PAULVE); U.S. Pat. No. 4,537,362 (ZULOAGA); and U.S. Pat. No. 5,526,637 (LEONARD) disclose different systems for clearing brush.

The above-mentioned patents do not provide efficient means to perform selective clearing of brush and trees.

SUMMARY OF THE INVENTION

It is an object of the present invention to provide a silvicultural apparatus and a process that satisfies the above-mentioned need. According to a preferred embodiment of the present invention, there is provided a mobile silvicultural apparatus for use in a land of trees, the apparatus comprising:

a steerable wheeled support frame comprising a horizontally extending ground clearing section, and first and second opposite vertical side sections, the ground clearing and side sections defining a tunnel shaped passage through which trees of a certain type are allowed to pass as the support frame travels thereover;

manipulating means mounted to the support frame for selectively manipulating trees of a land;

motor means for imparting motion to the support frame; and control means for controlling the steerable support frame, the motor means, and the manipulating means.

In an alternative preferred embodiment the mobile silvicultural apparatus is a land clearing tractor for selectively clearing a land of brush and trees. There is therefore provided a land clearing tractor for selectively clearing a land of brush and trees, the tractor comprising:

a traction unit for moving the tractor along a direction of travel;

a supporting frame connected to the traction unit, the frame having first and second sides, and a raised section between the first and second sides;

a first shredder head operatively connected to the first side of the frame and oriented parallel to the direction of travel, the first shredder head being movable between elevated and lowered positions for clearing brush and trees in a first band; and a second shredder head operatively connected to the second side of the frame, the second shredder head being parallel to the first shredder head and spaced apart therefrom, the second shredder head being movable between elevated and lowered positions for clearing brush and trees in a second band spaced apart from the first band and thereby leaving between the first and second bands a residual band of brush and trees.

As can be appreciated, the land clearing tractor according to the present invention cuts brush and trees in a pair of spaced apart bands so that brush and trees between the cut bands can be later selectively cut.

According to another aspect of the present invention, there is provided a land clearing tractor for selectively clearing a land of brush and trees, the tractor comprising:

a traction unit for moving the tractor along a direction of travel;

a frame having an inverted U-shaped cross-section with first and second sides, and a raised section between the first and second sides positioned between 0.5 and 1.5 meters from ground;

a first shredder head operatively connected to the first side of the frame through a first actuating lever arm, the first shredder head being oriented parallel to the direction of travel and being movable between elevated and lowered positions for clearing brush and trees in a first band; and a second shredder head operatively connected to the second side of the frame through a second actuating lever arm, the second shredder head being parallel to the first shredder head and spaced apart therefrom, the second shredder head being movable between elevated and lowered positions for clearing brush and trees in a second band spaced apart from the first band and thereby leaving between the first and second bands a residual band of brush and trees.

According to yet another aspect of the present invention, there is provided a process for selectively clearing brush and trees of a land, comprising the steps of:

clearing simultaneously first and second parallel and spaced apart bands of brush and trees with a land clearing tractor; and manually and selectively cutting brush and trees in a residual band between the two parallel and spaced apart bands.

The invention as well as its numerous advantages will be better understood by the following non-restrictive description of a preferred embodiment made in reference to the appending drawings.

DETAILED DESCRIPTION OF THE OF THE INVENTION

Figure 1:
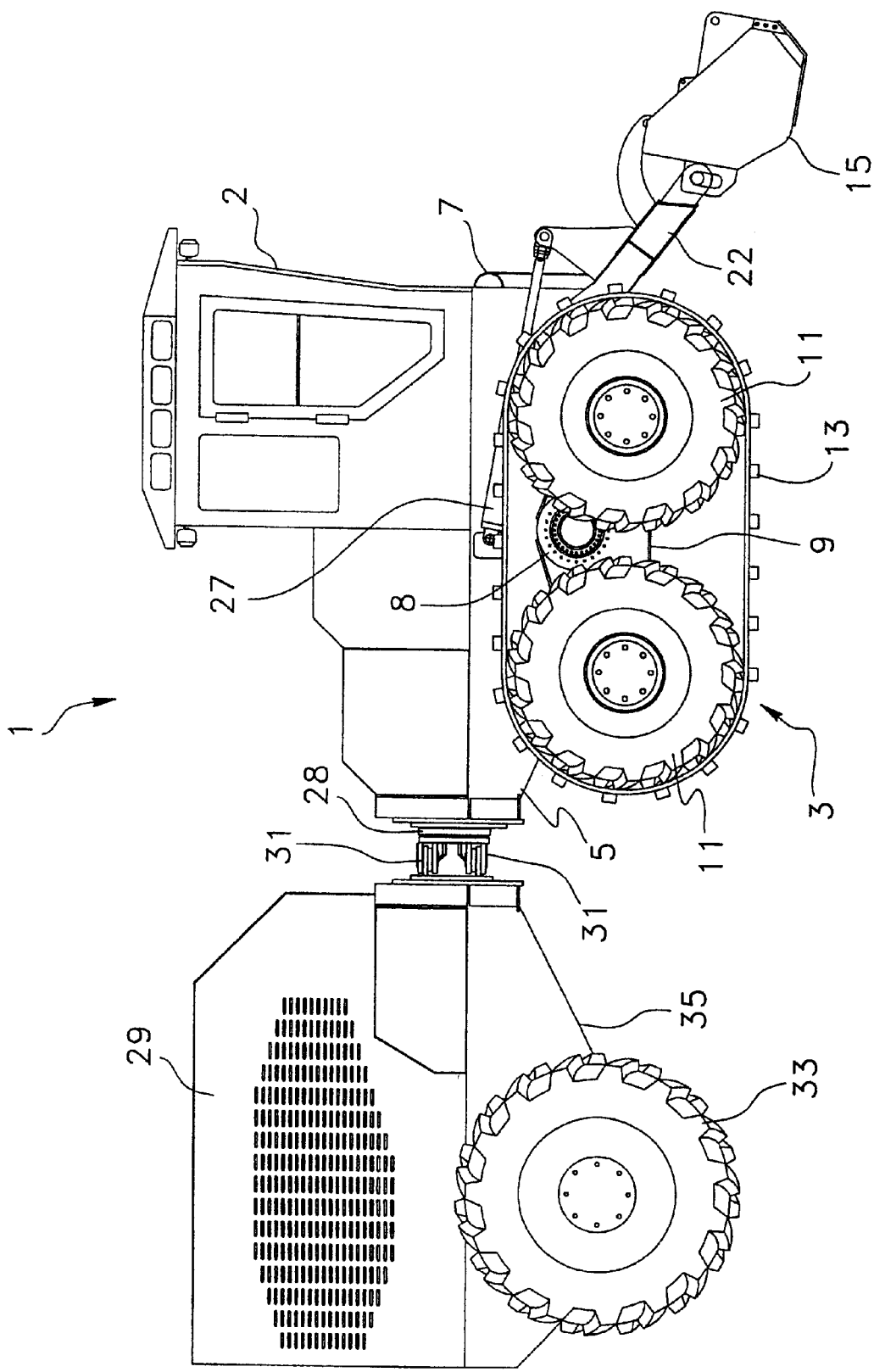
FIG. 1 is a side view of a land clearing tractor according to a preferred embodiment of the present invention with a rear cart and a shredder head in a lowered position.
Figure 2:
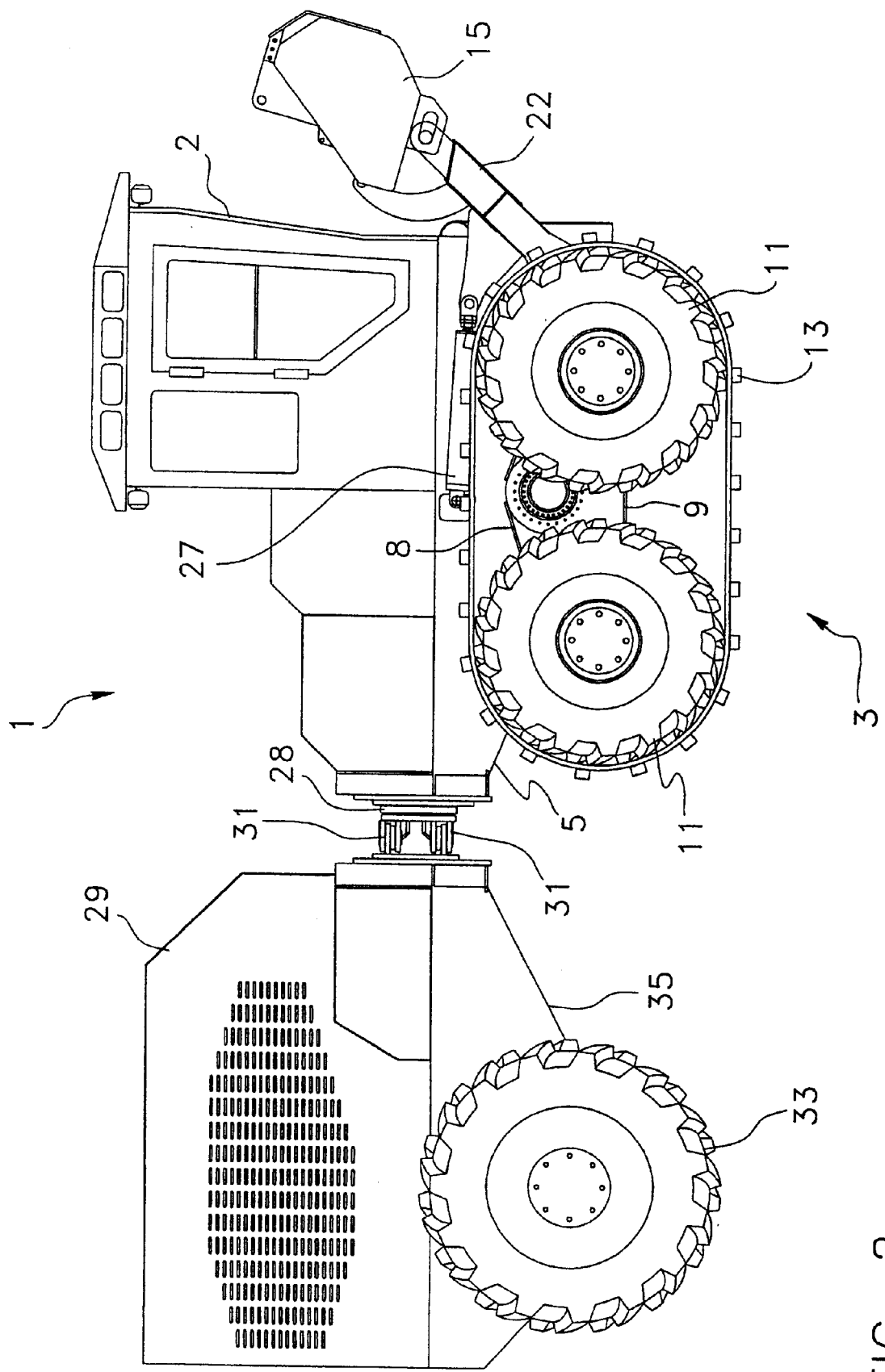
FIG. 2 is side view of the land clearing tractor shown in FIG. 1 with its shredder head in an elevated position.

In the following description, similar features in the drawings have been given similar reference numerals and in order to weight down the figures, some elements are not referred to in some figures if they were already identified in a precedent figure.

Referring to FIGS. 1 to 4, there is shown a land clearing tractor 1 according a preferred embodiment of the present invention. The land clearing tractor 1 may be a conventional type of tractor with a cabin unit 2 wherein the operator can control the operation of the tractor 1. As with conventional tractors, the present tractor 1 is provided with a traction unit 3 for moving it along a direction of travel.

Figure 3:
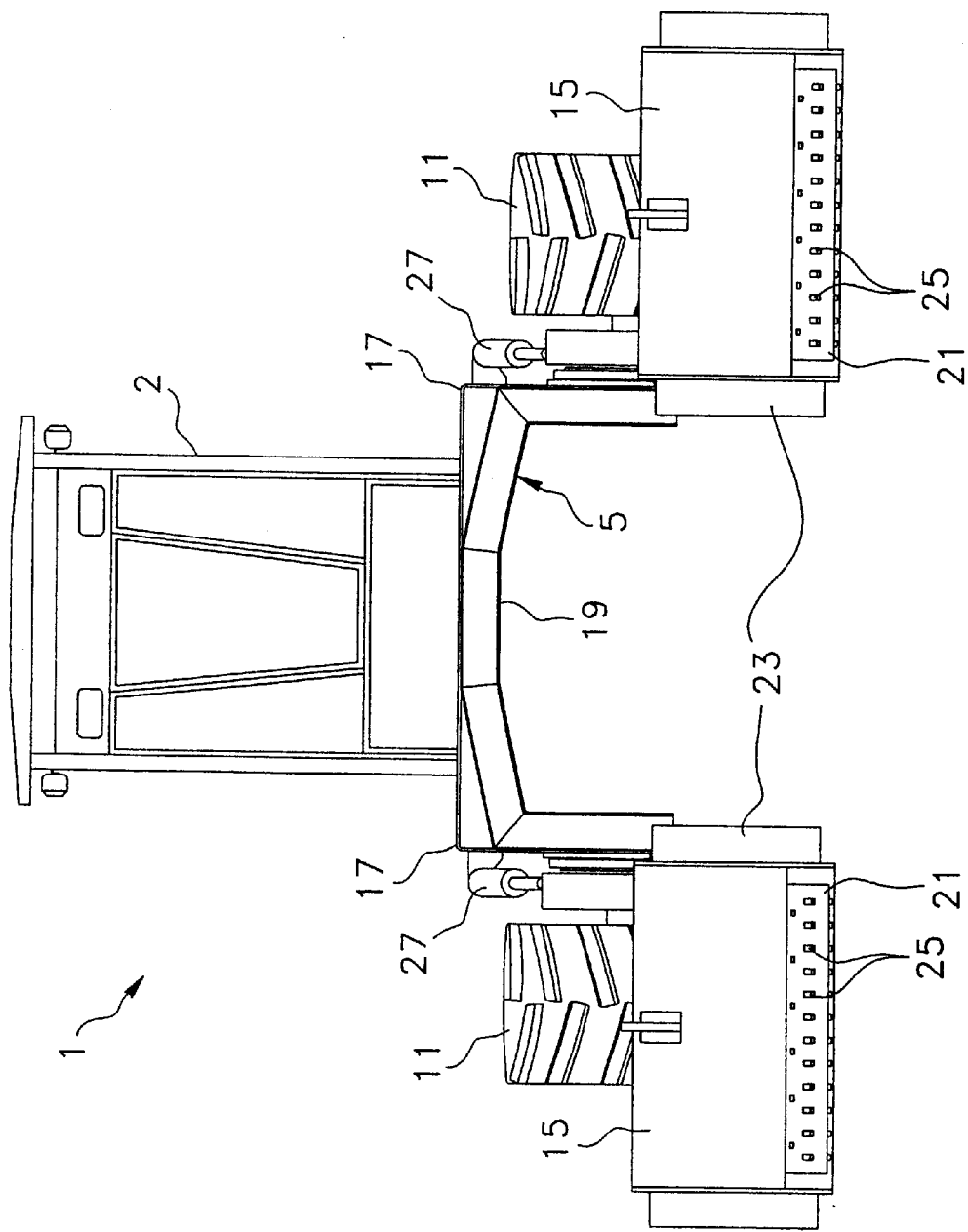
FIG. 3 is a front view of the land clearing tractor shown in FIG. 1 with both its shredder heads in a lowered position.
Figure 4:
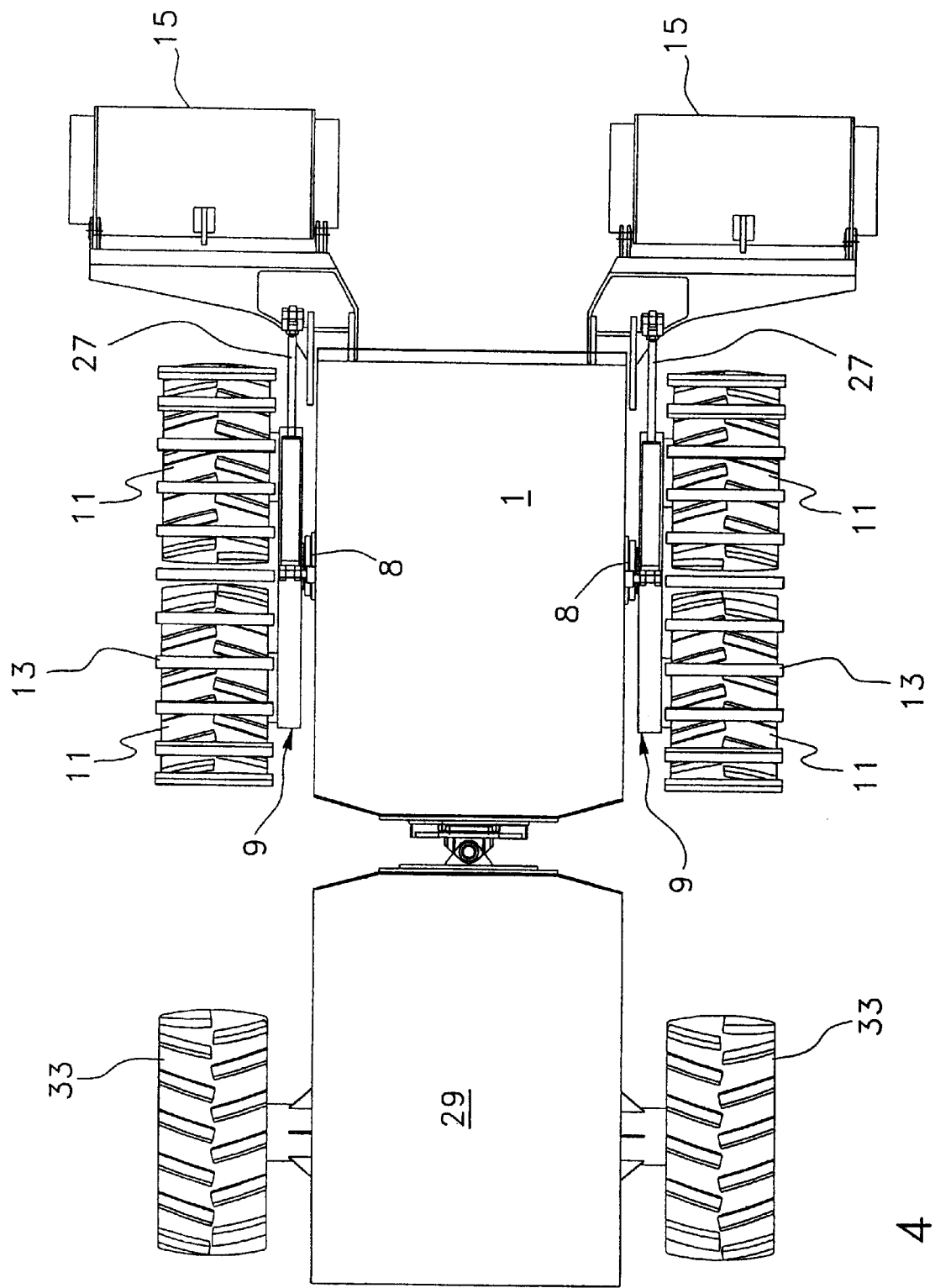
FIG. 4 is a top view of the land clearing tractor shown in FIG. 1.

The tractor 1 has a supporting frame 5 connected to the traction unit 3. As best shown in FIG. 3, the supporting frame 5 preferably has a generally inverted U-shaped cross-section with two opposite sides 17 and a raised section 19 between the opposite sides 17.

The traction unit 3 preferably includes sets of traction wheels 11 that are operatively connected to each side 17 of the frame 5. Preferably, each of the traction wheels 11 on the corresponding side 17 of the frame 5 are mounted onto a double tandem axle 9 which is pivotally connected to the supporting frame 5 by means of a pivoting anchor 8. Each traction wheel 11 is preferably driven by a respective drive shaft of a hydraulic motor (not shown) which is mounted onto the axle of each wheel 11 and which is commonly called hydrostatic motor-wheel. These hydraulic motors are preferably powered by a diesel motor (not shown) which is mounted on the supporting frame 5 of the tractor 1. The principle of operation of these hydraulic motors for driving the traction wheels 11 is well known in the art and will not be described in more detail herein. Furthermore, a track or continuous chain tread 13 may be positioned around the wheels 11 on each side of the tractor 1 for improving traction thereof.

Figure 6:
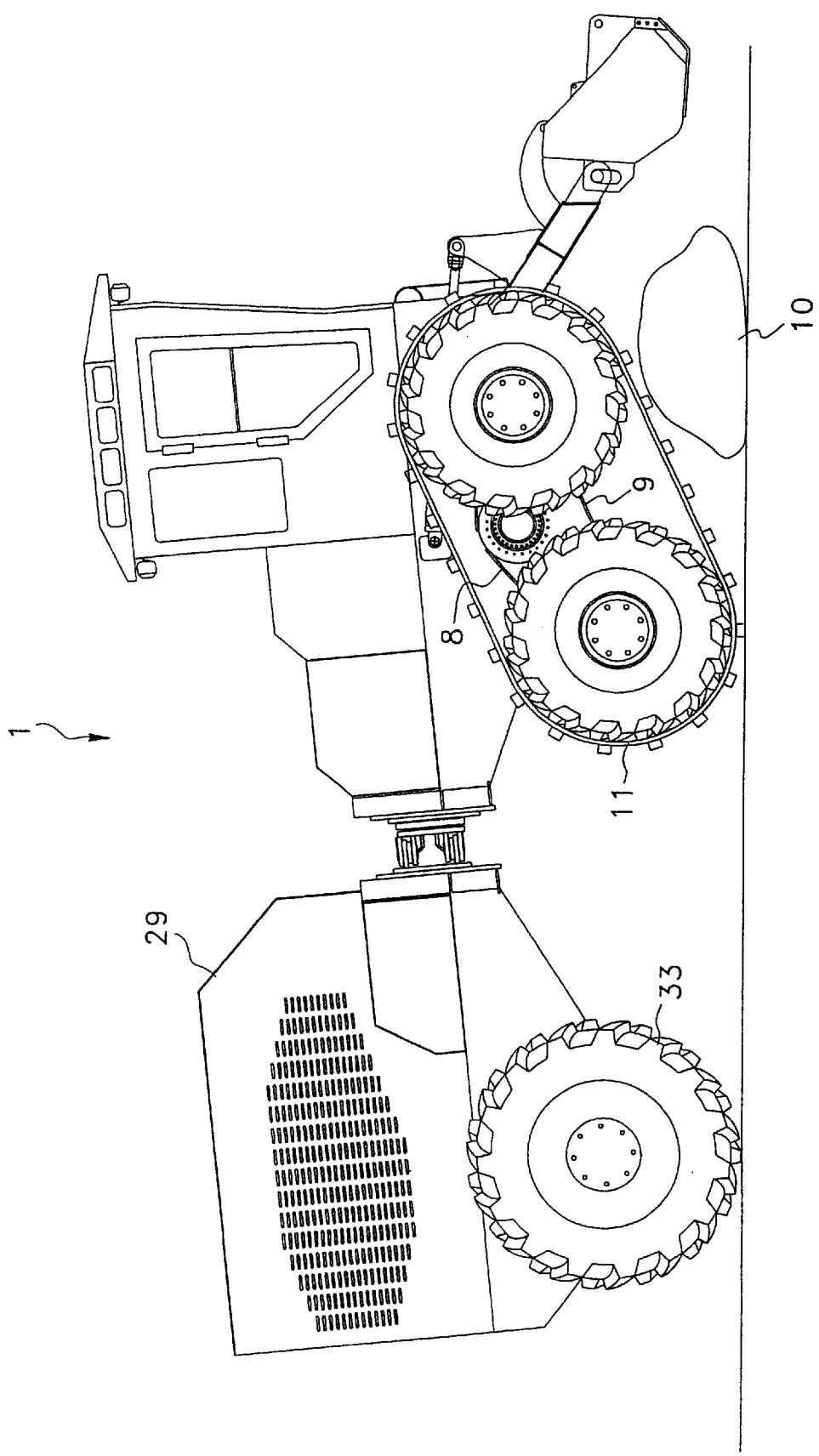
FIGS. 6 and 7 are side view s of the land clearing tractor shown in FIG. 1 as it climbs over an obstacle.
Figure 7:
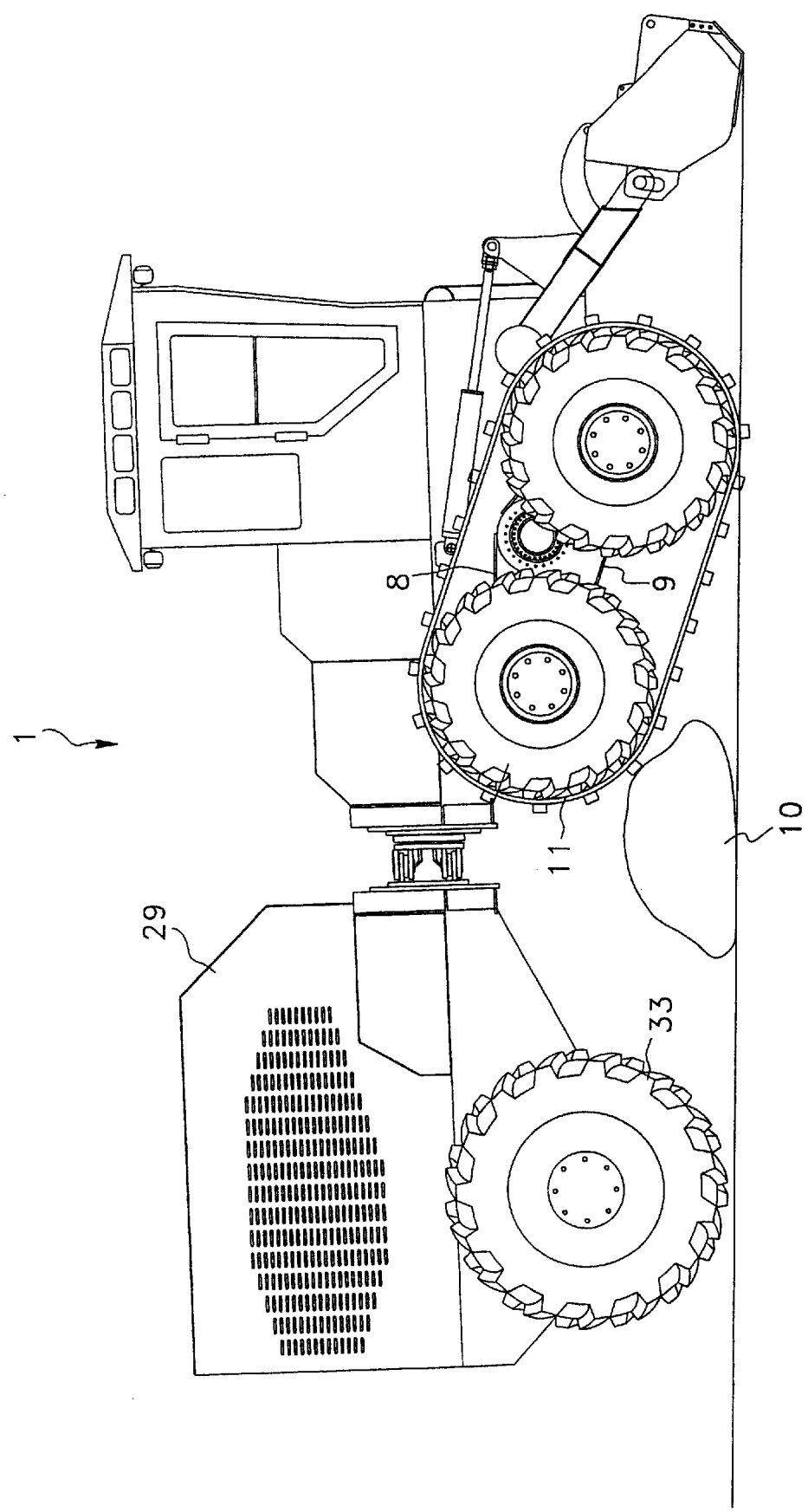

Referring to FIGS. 6 and 7, the land clearing tractor 1 is able to climb over obstacles and objects encountered in a forest site by means of the pivoting double tandem axles 9 and thanks to the pivoting anchors 8. For example, the tractor 1 is shown climbing over a rock 10.

As best shown in FIG. 3, the land clearing tractor 1 is provided with a pair of shredder heads 15 mounted in parallel at the front end of the supporting frame 5. Each of the shredder heads 15 is operatively connected to a respective side 17 of the supporting frame 5.

As can be appreciated, the raised section 19 of the supporting frame 5 that is located in between the shredder heads 15 allows the relatively safe passage of brush and trees thereunder. It is preferable that the raised section 19 be provided with a smooth surface so as to inflict minimal damage to brush and trees passing thereunder. The raised section 19 is preferably spaced between 0.5 to 1.5 meters from the ground.

The shredder heads 15 used may be of conventional type, such as the Bull Hog (trademark) shredder heads made by FECON. The shredder heads 15 are oriented parallel to the direction of travel of the tractor 1 and are spaced apart from each other so as to clear brush and trees in a separate bands and leaving there between a residual band of brush and trees. As with conventional types of shredder heads, the shredder heads 15 are movable between elevated and lowered positions for a more adequate clearing of the brush and trees. The shredder heads 15 are also preferably aligned in front of each of the side wheels 11, thereby facilitating the travel of the tractor 1 through a forest site. A flexible guard panel 7 may be provided at the front end of the tractor 1 to block branches from hitting the cabin 2 when the tractor 1 is moving forward and to prevent the branches of the brush and trees passing underneath the frame 5 from being cut by sharp edges of the tractor 1.

Each of the shredder heads 15 preferably has a horizontally disposed cylindrical drum 21 rotatably mounted in a housing 23. A plurality of spaced teeth 25 are provided on each drum 21 in order to fragment brushes and trees.

U.S. Pat. No. 4,355,670 (OHRBERG et al.) discloses another example of shredder head assembly that can be adapted to the tractor 1 of the present invention.

As persons skilled in the art will understand many changes can be brought to the structure of the above tractor. For example, the tractor may be provided with a single front shredder head just as in U.S. Pat. No. 4,355,670 (OHRBERG et al.). Such a tractor may be modified by connecting to it a lateral supporting frame provided with a raised section as described above for relatively safe passage of brush and trees thereunder. The other side of this lateral supporting frame is then operatively connected to a second shredder head.

Another way of achieving the same result of the above mentioned tractor is to use a regular tractor provided with a boom that can be directed toward any of the sides of the tractor. This boom supports a supporting frame provided with a raised section and to which are operatively connected two shredder heads on each of its respective sides. Of course, a rigid lateral structure may be used instead of the boom to achieve the same results.

Furthermore, the shredder heads do not have to be mounted at the front of the tractor, but these can be positioned in parallel at the back of the tractor as well.

Preferably, each of the shredder heads 15 is connected to its respective side 17 of the frame 5 by means of an actuating lever arm 22. Both lever arms 22 are preferably pivotally mounted on each side 17 of the frame and are each connected to an operator controlled hydraulic cylinder 27 also attached to the sides 17 of the frame 5 for pivoting the shredder heads 15 between lowered and elevated positions. Persons skilled in the art will understand that other mechanisms may be used to achieve the same results. For example, a mechanism can be designed where each of the shredder heads is only displaced vertically between lowered and elevated positions, without being pivoted on a lever arm.

Referring now to FIGS. 1, 2, 4 and 5, the land clearing tractor 1 may be further provided with a rear cart 29 which is coupled to a rear section 28 of the tractor 1 through a pair of pivoting coupling attachments 31. The rear cart 29 is provided with a pair of side wheels 33 and with a second motor (not shown) which is operatively connected to the hydraulic cylinders 27 actuating the shredder heads 15 and moving each of these between elevated and lowered positions. The second motor is also preferably operatively linked to the drum 21 for actuating the same. The second motor may be a diesel motor powering a hydraulic pump having conduits (not shown) extending towards the shredder heads 15. Of course, those skilled in the art will understand that the first motor (not shown) that is already mounted in the land clearing tractor 1 may also perform these functions of moving and actuating the shredder heads 15 in addition to actuating the traction unit 3. Alternatively, the first motor can be entirely discarded and only the second diesel motor in the rear cart can be used.

Figure 5:
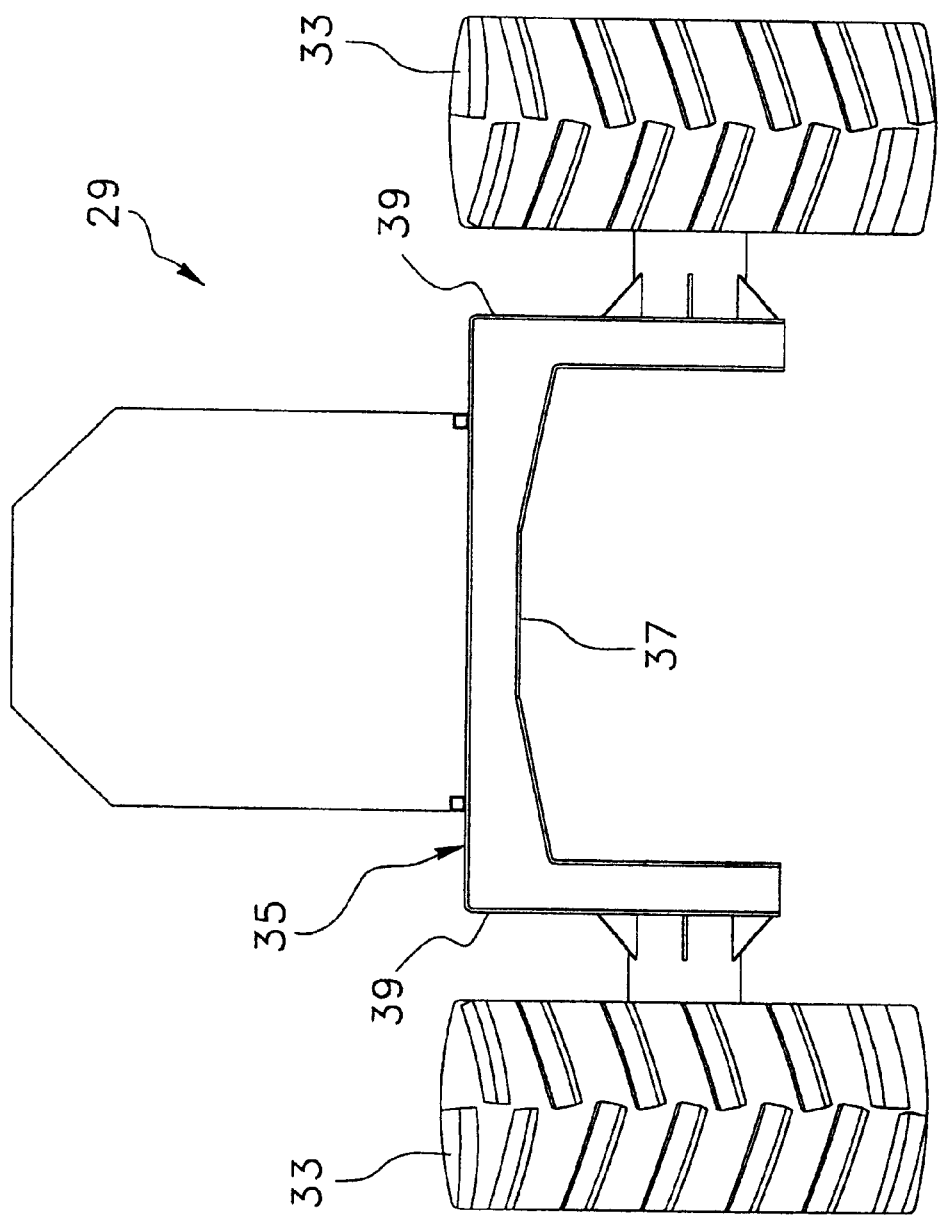
FIG. 5 is back view of the land clearing tractor shown in FIG. 1.

As best shown in FIG. 5, the cart 29 has a supporting frame 35 provided with a raised section 37 between sides 39 thereof, similar to the raised section 19 of the tractor 1. The purpose of the raised section 37 of the cart 29 is the same as discussed above: to allow the passage of brush and trees thereunder.

The present invention is also directed to a land clearing process, which essentially comprises the steps of:

clearing simultaneously first and second parallel and spaced apart bands of brush and trees with a land clearing tractor; and manually and selectively cutting brush and trees in a residual band between the two parallel and spaced apart bands.

In the above manual cutting step the quantity and quality of brush and trees to be cut in the residual band may vary according to particular requirements. The manual cut is preferably done by workers equipped with portable shredder tools.

The above process is also preferably accomplished by means of the land clearing tractor 1 which was described above. The process may then also comprise the following steps:

moving the tractor 1 along the direction of travel; and moving the shredder heads 15 between elevated and lowered positions for clearing brush and trees in two spaced apart bands and leaving there between a residual band.

In use, the land clearing tractor 1 cleared two bands of 1.75 meters of width separated by a residual band of 1.8 meters. Furthermore, tests have shown that if the raised section of the supporting frame has a height of 1.3 meters, trees having a height of 4 meters suffer damages in the order of 25%, whereas trees having a height of 3 meters suffer damages in the order of 5%.

The land clearing tractor of the present invention can be used in forest sites for pre-commercial clearing where the age of the trees ranges between 10 to 20 years and also in forest sites for regeneration clearing where the age of the trees is less than 10 years.

The use of the land clearing tractor of the present invention in the above process reduces the work up to 30 and 50 percent as compared with traditional selective clearing methods.

Persons skilled in the art will appreciate that the land clearing tractor of the present invention can also be used for performing a total clear of brush and trees in a field. In this case, the land clearing is moved in overlapping passes that also clear the residual bands of brush and trees.

Although a preferred embodiment of the present invention has been described in detail herein and illustrated in the accompanying drawings, it is to be understood that the invention is not limited to this precise embodiment and that various changes and modifications may be effected therein without departing from the scope or spirit of the present invention.

What is claimed is:

1. A land clearing tractor for selectively clearing a land containing brush and trees, the tractor comprising:

a traction unit for moving the tractor along a direction of travel;

a supporting frame connected to the traction unit, the frame having first and second sides, and a raised section between the first and second sides;

a first shredder head operatively connected to the first side of the frame and oriented parallel to the direction of travel, the first shredder head being movable between elevated and lowered positions for clearing brush and trees in a first band; and a second shredder head operatively connected to the second side of the frame, the second shredder head being parallel to the first shredder head and spaced apart therefrom, the second shredder head being movable between elevated and lowered positions for clearing brush and trees in a second band spaced apart from the first band and thereby leaving between the first and second bands a residual band of brush and trees.

2. The tractor according to claim 1, wherein the raised section of the frame has a smooth surface for inflicting minimal damage to brush and trees passing underneath in the residual band.

3. The tractor according to claim 2, wherein the raised section of the frame is positioned between 0.5 and 1.5 meters from ground.

4. The tractor according to claim 1, comprising:

a first actuating lever arm operatively connecting the first shredder head to the first side of the frame; and a second actuating lever arm for operatively connecting the second shredder head to the second side of the frame.

5. The tractor according to claim 1, wherein the traction unit comprises a first set of traction wheels mounted on the first side of the frame, and a second set of traction wheels mounted on the second side of the frame.

6. The tractor according to claim 5, wherein the first shredder head is aligned in front of the first set of wheels, and second shredder head is aligned in front of the second set of wheels.

7. The tractor according to claim 5, wherein each of the first and second set of wheels comprises a continuous chain tread.

8. The tractor according to claim 5, wherein the traction unit comprises a motor operatively connected to the first and second set of traction wheels for moving the tractor along the direction of travel.

9. The tractor according to claim 8, wherein the motor is operatively connected to the first and second shredder heads for moving each of the shredder heads between the elevated and lowered positions and for actuating the shredder heads.

10. The tractor according to claim 8, further comprising:

a cart coupled to the traction unit; and a second motor mounted in the cart and operatively connected to the first and second shredder heads for moving each of the shredder heads between the elevated and lowered positions and for actuating each of the shredder heads.

11. A land clearing tractor for selectively clearing a land of brush and trees, the tractor comprising:

a traction unit for moving the tractor along a direction of travel;

a frame having an inverted U-shaped cross-section with first and second sides, and a raised section between the first and second sides positioned between 0.5 and 1.5 meters from ground;

a first shredder head operatively connected to the first side of the frame through a first actuating lever arm, the first shredder head being oriented parallel to the direction of travel and being movable between elevated and lowered positions for clearing brush and trees in a first band; and a second shredder head operatively connected to the second side of the frame through a second actuating lever arm, the second shredder head being parallel to the first shredder head and spaced apart therefrom, the second shredder head being movable between elevated and lowered positions for clearing brush and trees in a second band spaced apart from the first band and thereby leaving between the first and second bands a residual band of brush and trees.

12. A process for selectively clearing brush and trees of a land, comprising the steps of:

clearing simultaneously first and second parallel and spaced apart bands of brush and trees with a land clearing tractor; and manually and selectively cutting brush and trees in a residual band between the two parallel and spaced apart bands.

13. The process according to claim 12, wherein the land clearing tractor is as defined in claim 1 and the step of clearing simultaneously comprises the steps of:

moving the tractor along the direction of travel; and moving the first and second shredder heads between elevated and lowered positions for clearing brush and trees in the first and second spaced apart bands and leaving therebetween the residual band.

14. The process according to claim 12, wherein the land clearing tractor is as defined in claim 11 and the step of clearing simultaneously comprises the steps of:

moving the tractor along the direction of travel; and moving the first and second shredder heads between elevated and lowered positions for clearing brush and trees in the first and second spaced apart bands and leaving therebetween the residual band.

15. A mobile silvicultural apparatus for use in a land containing trees, the apparatus comprising:

a steerable wheeled support frame comprising a horizontally extending ground-clearing section, and first and second opposite vertical side sections, the ground-clearing and side sections defining a tunnel-shaped passage through which trees of a certain type are allowed to pass as the support frame travels thereover;

manipulating means mounted to the support frame for selectively manipulating trees of the land;

motor means for imparting motion to the support frame; and control means for controlling the steerable support frame, the motor means, and the manipulating means.

* * * * *